United States Patent
Schloegel et al.

(10) Patent No.: US 7,219,328 B2
(45) Date of Patent: May 15, 2007

(54) MODEL-BASED COMPOSABLE CODE GENERATION

(75) Inventors: Kirk A. Schloegel, Independence, MN (US); David V. Oglesby, Maple Grove, MN (US); Eric Engstrom, Shoreview, MN (US); Devesh Bhatt, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 568 days.

(21) Appl. No.: 10/229,827

(22) Filed: Aug. 28, 2002

(65) Prior Publication Data

US 2004/0044990 A1    Mar. 4, 2004

(51) Int. Cl.
*G06F 9/44* (2006.01)
(52) U.S. Cl. ............... 717/104; 717/106; 717/107
(58) Field of Classification Search ......... 717/2–158
See application file for complete search history.

(56) References Cited

U.S. PATENT DOCUMENTS

| | | | |
|---|---|---|---|
| 4,796,179 A | 1/1989 | Lehman et al. | 700/86 |
| 6,182,153 B1 | 1/2001 | Hollberg et al. | 719/315 |
| 6,230,318 B1* | 5/2001 | Halstead et al. | 717/108 |
| 6,269,475 B1 | 7/2001 | Farrell et al. | 717/113 |
| 6,463,582 B1* | 10/2002 | Lethin et al. | 717/158 |
| 2001/0037496 A1* | 11/2001 | Simonyi | 717/7 |
| 2002/0016954 A1* | 2/2002 | Charisius et al. | 717/2 |
| 2002/0147969 A1* | 10/2002 | Lethin et al. | 717/138 |
| 2003/0167455 A1* | 9/2003 | Iborra et al. | 717/105 |

OTHER PUBLICATIONS

Oglesby et al., "A Pattern-based Framework to Address Abstraction, Reuse, and Cross-domain Aspects in Domain Specific Visual Languages", Proceedings of OOPSLA, 2001.
"Domain-Specific Modelling: 10 Times Faster Than UML", Jan. 2001, MetaCase Consulting, pp. 1-10.
Ledeczi et al., "On Metamodel Composition", Institute for Software Integrated Systems, IEEE CCA, Sep. 5, 2001, 5 pgs.
"SAGE: An Application Integration Tool Suite for Embedded and Distributed Computing Systems", Copyright Tandel Systems LLC, Rev. 2.0, May 2002.
Generic Modeling Environment, "GME 2000 User's Manual", Version 2.0, Dec. 2001, Institute for Software Integrated Systems Vanderbilt University 1-88.
Wilkie et al., Intelligent OOA Customer Technical Note, "The Intelligent OOA Strategy for Configurable Code Generation", Version 2.0, Jul. 4, 1997, pp. 1-34.
Gamma et al., "Design Patterns: Elements of Reusable Object-oriented Software", Addison-Wesley, 1995, pp. 163-173.

* cited by examiner

*Primary Examiner*—Meng-Al T. An
*Assistant Examiner*—Mark P. Francis
(74) *Attorney, Agent, or Firm*—McDonnell Boehnen Hulbert & Berghoff LLP

(57) ABSTRACT

A framework is provided for generating code for the model-based development of a system. According to the framework, the model-based system is modeled using graphical modeling entities. A modular code generator routine is attached directly to at least one of the graphical modeling entities or to a meta-entity or to a collection of entities. The graphical modeling entities are traversed in order to access specified code generator routines. Each of the accessed code generator routines is executed so as to build up code portion by portion for the system.

27 Claims, 7 Drawing Sheets

MODEL-BASED COMPOSABLE CODE GENERATION

GOVERNMENT FUNDING

The invention described herein was made with U.S. Government support under Grant Number F33615-00-C-1705 awarded by the United States Air Force. The United States Government has certain rights in the invention.

TECHNICAL FIELD OF THE INVENTION

The present invention relates to model-based composable code generation.

BACKGROUND OF THE INVENTION

Many applications and engineering domains are increasingly employing a graphical model-based development approach. With the recent availability of graphical modeling notations, methodologies, and tools for domain specific modeling, a graphical model-based development approach has the promise of providing a seamless progression of a system model through the different phases of development. These phases include, for example, preliminary design, analysis and simulation, automated code generation, testing, and system integration.

However, some core technologies need to be developed in order to realize this promise. A key enabling technology is a method for robust and complete generation of code, configuration files, documentation, and other artifacts from graphical models. Model-based development tool suites have made a number of advances in this area in the last decade.

Yet, current approaches to code generation are still limited in their flexibility and customizability for a number of reasons. For example, because graphical models and code generators are separate, yet intricately interrelated, a dual hierarchy has to be maintained. One hierarchy is provided for code generation, and the other hierarchy is provided for the compositional structure of the graphical modeling notation. These hierarchies, although separate, must correspond to one another. Unfortunately, dual hierarchies make development, customization, and verification of code generators difficult. Also, modification of the modeling notation or the code generator in a manner that maintains the consistency between the two hierarchies is difficult.

Moreover, while a number of tools provide support for generating partial code, no tools provide support for complete and robust cross-domain code generation.

Furthermore, different domain specific modeling tools have not been designed to work together to co-generate code, making cross-domain, system wide code generation a burden on the code generator developer.

More specifically, the content of generated code is derived from (a) the structure of the model and (b) the specific values assigned to the properties of model entity instances. Therefore, the structure and semantics of code generator routines are highly dependent upon many details of those modeling notations for which models of interest conform.

All graphical model-based tools utilize modeling notations, and therefore have some kind of meta data. However, often these meta data exist only implicitly in the source code of the tool. For other tools, the meta data are explicitly represented by a meta model.

The relationship between modeling notations and code generators is illustrated by the example shown in FIG. 1. In this example, a graphical model-based tool 10 is composed of both an instance model 12 and an internal meta model 14. In the example of FIG. 1, the unified modeling language (UML) class diagram graphical modeling notation is illustrated for the instance model 12. The UML class diagram concepts are also used to graphically represent the meta model 14.

Meta models, such as the meta model 14, specify the structures and semantics of graphical modeling notations. Instance models, such as the instance model 12, represent instances of legal constructs that conform to some specific graphical modeling notation. Essentially, instance models are built to model systems and solutions while conforming to a modeling notation. An instance model (or simply a model) is a set of modeling entities that form a structure and have values supplied for their attributes. Each modeling entity is associated with a meta-entity via an instantiation relationship. A meta-entity specifies the structure of a modeling entity in the same way that a meta model specifies the structure of an instance model.

In the meta model 14, the class meta-entity 14*a* defines the meta data for all instances of classes in all models that conform to the modeling notation that the meta model 14 specifies. We refer to the class 14*a* as the meta-entity for all such class instances. Similarly, the method 14*b* is the meta-entity for all instances of method modeling entities, and the attribute 14*c* is the meta-entity for all instances of attribute modeling entities. The meta model 14 indicates that entity instances of type "class" can contain entity instances of type "attribute" and "method." Therefore, for each class that exists in an instance model, the code generator must be sure to loop over all of its attributes and methods in order to generate their portions of the code. These loops are shown in a call graph 16 depicting the control flow of a code generator.

In general, because the subroutine calling and iteration structures of code generators must be written to correspond to the union of legal model instances, code generators must know the structure of the meta model. Furthermore, these code generators also tend to replicate the structure of the meta model in their own structure. Hence, two separate, but corresponding, structural hierarchies are maintained, one within the code generator and the other within the compositional structure of the graphical modeling notation.

For a simple graphical modeling notation, and for simple forms of code generation, this dual hierarchy technique may be adequate. However, as the complexity of the graphical model and/or required generated code increases, the shortcomings of this dual hierarchy technique become more problematic.

Moreover, the expressiveness of a graphical modeling notation is a limiting factor on the richness of the generated code because every bit of knowledge that can be generated from a model must be specified within the model or must be hard coded in the code generator. Because domain specific graphical modeling notations tend to be deep instead of broad in their expressiveness, domain specific graphical modeling notations limit the nature of the code that can be readily generated.

For example, UML class diagrams specify software structure and, therefore, provide a good foundation for code generation of class and method declarations and shells. However, this graphical modeling notation does not specify information that is necessary for generating behavioral (e.g., method body) code. On the other hand, data flow diagrams support behavioral code generation well but not structural code generation.

The drive for more complete code generation has led to an increase in the demand for new code generation techniques that can link graphical modeling notations together. For example, UML and data flow diagrams (as well as others) could be used cooperatively to describe different aspects of a single (multi-model) software system. Initial work has been done investigating methods for stitching together graphical modeling notations in support of multi-domain, multi-model system graphical modeling techniques. However, this area is still not well understood.

Furthermore, a number of current model-based development tool suites have addressed some of the issues concerning linking together diverse graphical modeling notations in order to generate more complete code for specific application domains. These suites have seen some successes in generating code for specific procedural and/or object-oriented programming languages. However, the graphical modeling notations supported by such tool suites are only internally linked together (i.e., a predefined set of these links are hard-coded in the tool infrastructure). They provide little support for developers to link in new graphical modeling notations from different tools or even extend the way in which supported notations are linked together. Also, these tool suites specialize in generating programming code, but provide less support for generating other types of artifacts, especially when multi-tool cooperation is required.

As an example, a number of diverse embedded systems utilize configuration files to map software components to threads, threads to processes, and processes to hardware, as well as to provide initialization information for distributed system middleware. Typically, configuration files require information specified in more graphical modeling notations than any single tool suite supports. Because there is currently little or no support for the co-generation of configuration files or other cross-domain artifacts between different tool suites, most—if not all—of the complexity regarding how the various tools interact needs to be hard coded in the code generator.

Essentially, the burden is completely on the code generator developer to integrate tools in the interest of cooperative code generation. However, handling complex cross-domain interactions is error prone, and the end product is usually not easily modifiable. These problems are exacerbated when new tools are added, or existing tools are modified, because even small changes may require significant restructuring of affected code generators.

The present invention overcomes one or more of these or other problems.

SUMMARY OF THE INVENTION

In accordance with one aspect of the present invention, a method of generating code in a model-based development environment comprises the following: modeling a system using graphical modeling entities; attaching a modular code generator routine directly to at least one of the graphical modeling entities; traversing through the graphical modeling entities to access the code generator routine; and, executing the accessed code generator routine so as to generate code for the system.

In accordance with another aspect of the present invention, a method of generating code in a model-based development environment comprises the following: modeling a system using graphical modeling entities; attaching modular code generator routines directly to the graphical modeling entities such that each of at least some of the graphical modeling entities has more than one code generator routine attached thereto; accessing the code generator routines such that, for each of the graphical modeling entities having more than one code generator routine attached thereto, only one of the code generator routines is selected based upon some criteria; and, executing each of the selected code generator routines so as to generate the code.

In accordance with still another aspect of the present invention, a method of developing code comprises the following: attaching at least one modular code generator routine directly to each of a plurality of graphical modeling entities; traversing through the graphical modeling entities; accessing the code generator routines of each traversed modeling entity; selecting only one modular code generator routine per graphical modeling entity; and, executing each of the accessed code generator routines so as to generate the code.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
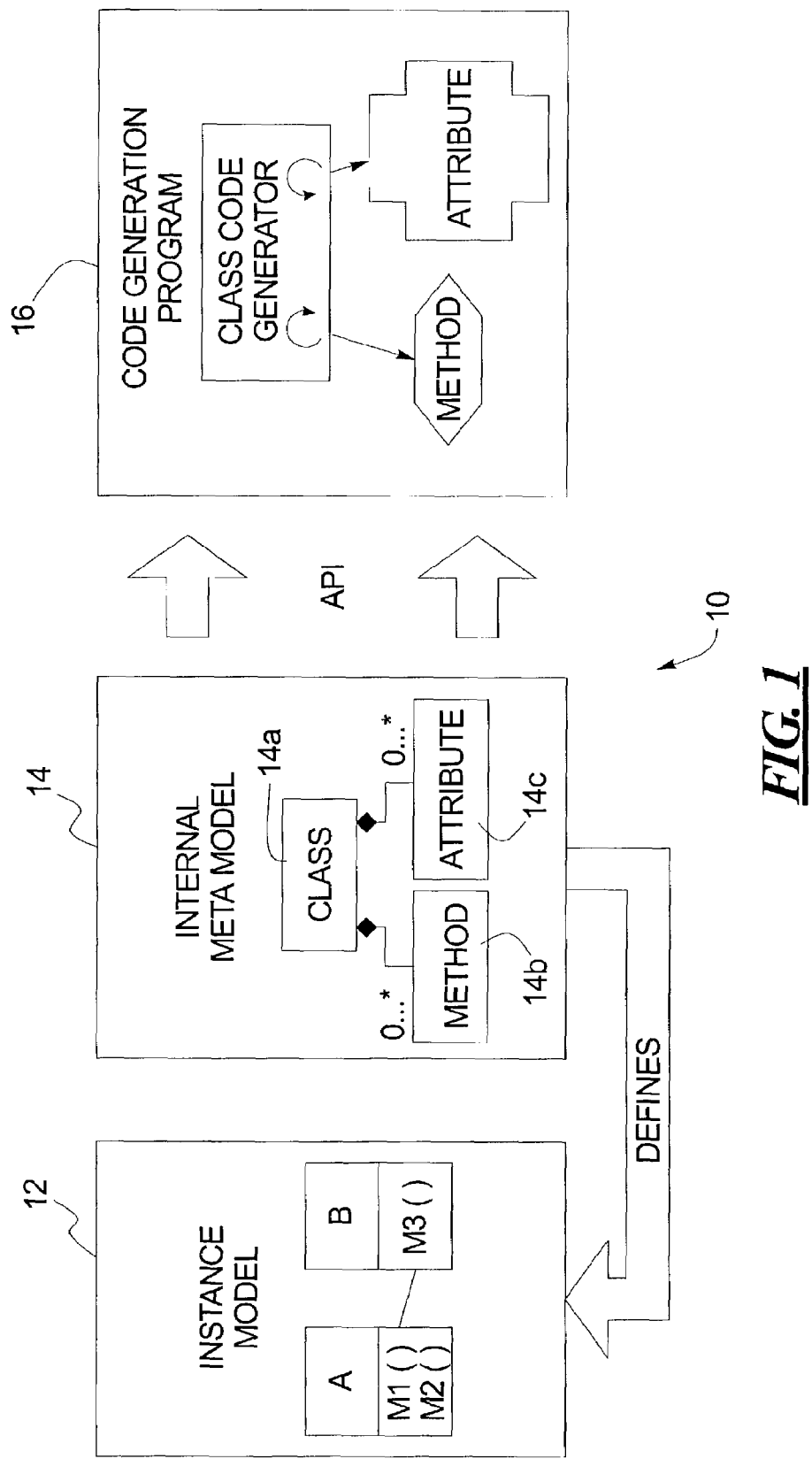
FIG. 1 illustrates an exemplary relationship between modeling notations and code generators.

An embodiment of the present invention involves a novel framework for generating code and other artifacts and is referred to herein as model-based composable code generation. According to this framework, code generators are composed of modular entity-specific code generator routines that are attached directly to graphical modeling entities or the meta data of the model-based entities or a collection of modeling entities. The attachment may be implemented as calls to the code generator routines that are embedded in the graphical modeling entities, as URL or other links or paths from the graphical modeling entities to the code generator routines, etc. Attaching a routine to a meta-entity in effect attaches it to all instances of that entity type in all instance models that conform to the modeling notation. Attaching a routine to a collection of modeling entities in effect attaches it to all of the individual modeling entities or meta-entities that make up the collection. Also, as there are many different types of code that can be generated, each entity or meta-entity or group of entities can have multiple routines of different purposes attached to them. The specific code generation routine that performs a given purpose can be selected by providing a key. Consequently, the code generators according to the present invention are not written as monolithic programs that are separate from their corresponding graphical models as has been the past practice. Code generation according to the framework of the present invention is accomplished by traversing through the entities of the graphical model, querying each graphical model entity that is encountered for a specific code generator routine and then executing each accessed code generator routine. Querying an entity for its applicable routine can be performed as a subroutine call from within another routine (or general purpose program). Therefore, one routine can access and execute another routine dynamically during its own execution.

The order of entity traversal during code generation can be application specific. For example, the order of entity traversal during code generation could be random, or ordered by type, or sorted by name, or filtered so that only entities with a specific property are traversed, or the graph could be traversed in various other ways such as depth-first traversal.

This approach to code generation is flexible, easy, and customizable. Also, this approach provides immense possibilities for the composition of code generators, and this approach provides a framework under which it is possible to reason and/or prove qualities about the generated code.

In order to add additional power and flexibility to the code generation of the present invention, especially in the context of cross-domain and multi-tool cooperative code generation, the notion of generator specialization is also incorporated into the framework. Generator specialization is analogous to polymorphism in object oriented programming languages. That is, generator specialization provides a mechanism for generating specialized code dependent upon a variety of factors, such as instance specific variability and general cross-domain interactions.

Archetypes for graphical model-based development have been discussed in "A Pattern-based Framework to Address Abstraction, Reuse, and Cross-domain Aspects in Domain Specific Visual Languages" by D. Oglesby, K. Schloegel, D. Bhatt, and E. Engstrom, *Proceedings of OOPSLA*, 2001. Archetypes can be used to address both the lack of reuse in current modeling tools and the relatively low level of abstraction that these tools provide. The initial motivation behind the development of archetypes was to have a means of realizing and reusing design patterns for graphical model-based development. These reusable design patterns can then be used as basic building blocks of graphical modeling. In addition to promising results in this area, archetypes are proving to be extremely useful in support of general cross-domain and multi-tool code generation.

Archetypes are domain independent graphical modeling entities that may be used to encapsulate one or more domain specific graphical models as well as archetype-specific code generators. Because they are domain independent, archetypes may be instantiated in any domain specific graphical model. However, because they can include their own code generators, they can be interpreted from within arbitrary modeling notations and can be abstracted to a single black box graphical modeling entity.

In support of rich code generation, archetype instances often require information from the domain specific graphical models in which they are instantiated. They often supply information to these graphical models as well. Such information flows through portals that are explicit application programming interfaces (API's) of archetypes. Archetypes connect to other graphical modeling entities only through these portals. Correctly connecting archetypes in this way completes their context and allows for maximum code generation.

The use of archetypes has a number of advantages in the present invention. Moreover, archetypes make cross-domain information available to arbitrary graphical modeling notations in support of rich code generation. Furthermore, archetypes can include their own specialized code generator routines. Therefore, they fit well in the model-based composable code generation framework of the present invention.

Model-based composable code generation relies on code generators that are composed of a number of modular, entity-specific code generator routines, each of which is attached directly with a corresponding graphical modeling entity and/or its meta-entity. Accordingly, these code generators are not written as monolithic programs that are separate from graphical models. Instead, the code generator of the present invention involves traversing through the entities of the graphical model, querying them for their corresponding code generator routines, and then executing the returned generator routines.

The present invention allows a degree of flexibility in that traversal of modeling entities can be made both by the top-level code generation operation and by the entity-specific routines. For the instance model 12 in FIG. 1, the top-level code generation operation calls traverse the classes, and each of the class routines traverses the methods of its corresponding class. This capability is critical due to the diverse ordering constraints inherent in the syntax of the generated code. For example, operations must be written within the scope of their class in Java code. However, in C++, operations need only be declared within the scope of their class. Their bodies can be written elsewhere.

Additionally, model-based composable code generation includes a capability that is analogous to context completion of archetypes. That is, meta model entities and instance model entities can contain properties and/or code generator routines that can be accessed by code generator routines attached to other graphical modeling entities from the same or different graphical modeling notations. Therefore, this content completion capability provides a mechanism for diverse graphical modeling notations to work together to co-generate code. In other words, this content completion capability allows code generator routines to access data as well as other code generator routines from different graphical modeling notations.

A major benefit of model-based composable code generation is that only a single unified compositional hierarchy exists because the code generator routines take on the hierarchy of the graphical modeling notation and/or the instance models. Thus, the problems of the dual hierarchy of the prior art are avoided. Additionally, the close integration between graphical models and code generator routines makes it easier to reason and/or prove qualities about generated code compared to current code generation techniques.

For example, in model-based composable code generation, graphical modeling entities can be interactively examined in order to determine exactly which code generator routines will be called during code generation. Monolithic code generation programs, on the other hand, rely on dynamically evaluated switching statements and other control primitives that make it extremely difficult to provide an analogous capability.

Also, it is quite natural in model-based composable code generation to compose a code generator instead of executing one. That is, during the code generation process, the graphical model is traversed, and each graphical modeling entity that is encountered is queried for its attached code generator routine. Normally, this code generator routine is immediately executed. Alternatively, the code generator routine could be written to file (instead of being executed). A code generator composed in this way would comprise a single basic block with no iterations or subroutine calls. It is much easier to analyze a single basic block of code for verification purposes than code containing loops and dynamic control flow statements with current techniques.

Another benefit of model-based composable code generation is that writing code generators is easier for at least two reasons. First, automatic support exists for traversing the structural hierarchies that are likely to exist within graphical modeling notations in order to find graphical modeling entities of interest and to query these graphical modeling entities for specific property values and/or their appropriate code generator routines. (Examples include Xpath, depth-first traversal, breadth-first traversal, attribute-based sorting, topological-based sorting, filtering techniques, etc.) Second, model-based composable code generation is conducive to the development of small, modular, and easy to understand code generator routines, making debugging and maintenance easier.

Moreover, model-based composable code generation is powerful and customizable; it provides immense possibilities for the composition of code generators; and, it provides a flexible framework under which it is possible to reason and/or prove qualities about the generated code.

In order to increase the capability of model-based composable code generation to support cross-domain and multi-tool cooperative code generation, the concept of generator specialization is introduced. As indicated above, generator specialization is analogous to polymorphism in object oriented programming languages. Generator specialization provides a mechanism for generating specialized code dependent on a variety of factors, including instance specific variability and general cross-domain interactions.

In model-based composable code generation, a graphical modeling entity may have several code generator routines attached to it or to its meta-entity or to one or more collections of which it is a member. For example, a graphical modeling entity may have a base code generator routine attached to its meta-entity and one or more specialized code generator routines attached to it. Accordingly, when such a graphical modeling entity is queried for its attached code generator routine, this graphical modeling entity selects from a number of available code generators that can be executed. This set of available code generators is initially limited to those associated (via an index key) with the type of code that is specified. Examples include, but are not limited to, Java source code, C++ source code, documentation, and middleware configuration files. A single routine must be selected from this set to be executed.

A priority scheme may be implemented in order to facilitate this selection. In this priority scheme, more specific code generator routines are given a higher priority than more general code generator routines. For example, four levels of generator specialization may be used. The five levels of code generator routines (the four levels of specialized code generator routines and the one level corresponding to the base code generator routine) may have the following order of decreasing precedence: instance specialization; scoped specialization; stereotype specialization; cross-domain specialization; and the base case.

Accordingly, if a specialized code generator routine is attached to a graphical modeling entity in addition to the base code generator routine, the specialized code generator routine will be selected for code generation over the base code generator routine. Alternatively, if a specialized scoped code generator routine is attached to a graphical modeling entity in addition to a specialized cross-domain code generator routine, the specialized scoped code generator routine will be selected for code generation over the cross-domain code generator routine.

Although a specific order of preference has been described above, the order of precedence may be different than that stated above and may change from design to design.

Figure 2:
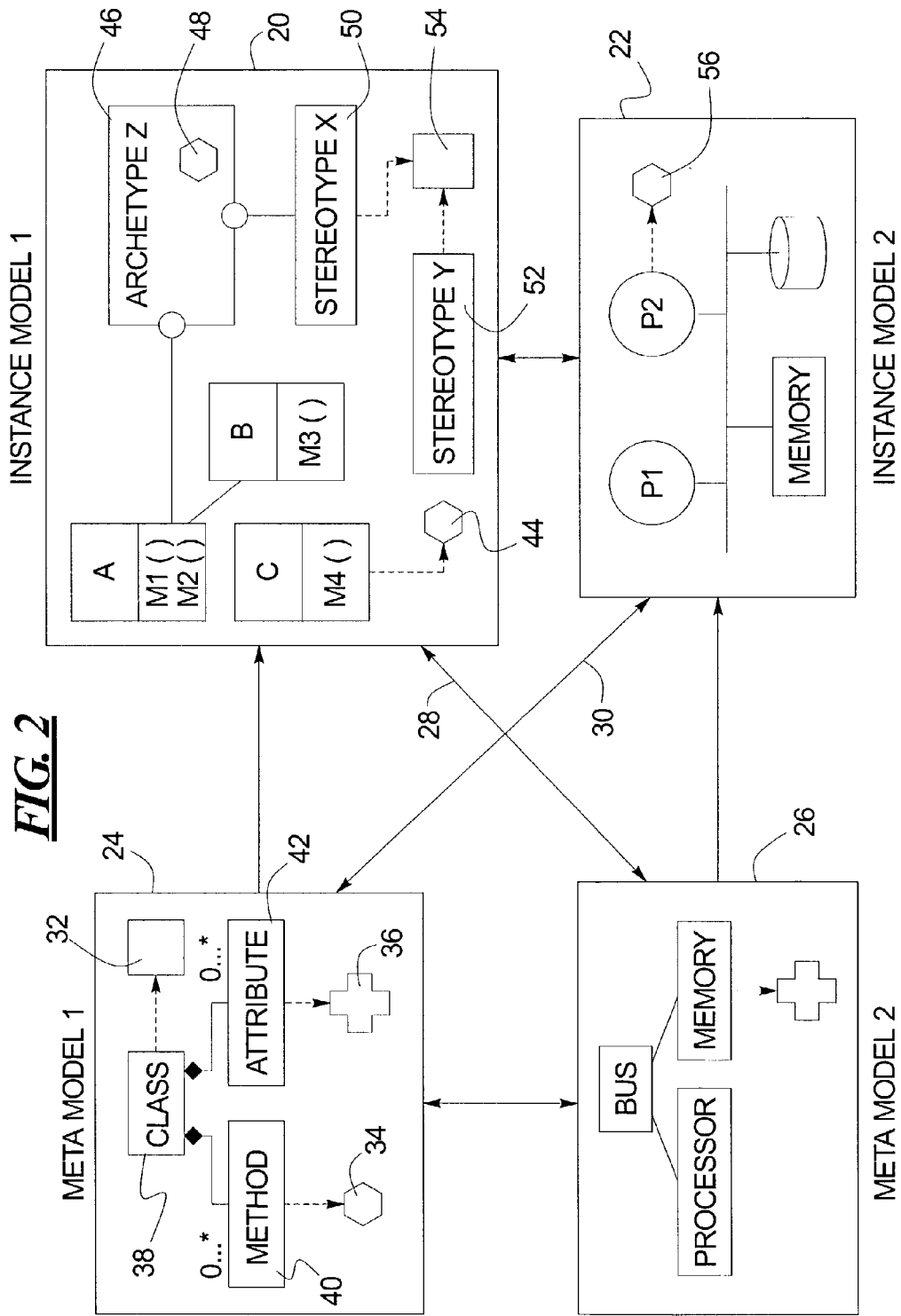
FIG. 2 illustrates an exemplary relationship between graphical modeling entities and code generators according to the present invention.

Model-based composable code generation is illustrated by way of example in FIG. 2. Two instance models 20 and 22 conforming to different, but interacting, modeling notations are illustrated. The modeling notation of the instance model 20, for example, may represent the software domain, and the modeling notation of the instance model 22, for example, may represent the hardware domain. A meta model 24 defines the graphical modeling notation for the instance model 20, and a meta model 26 defines the graphical modeling notation for the instance model 22. In general, each meta-entity in a meta model defines a type of modeling entity that can be instantiated or otherwise used within that modeling notation. For example, the class meta-entity 38 defines all instances of classes that are instantiated (A, B, and C). Additionally, cross-domain links 28 and 30 represent some of the complex interactions that exist between these two domains.

As shown in FIG. 2, base code generator routines 32, 34, and 36 are attached to corresponding graphical meta modeling entities 38, 40, and 42 of the meta model 24. These base code generator routines are default code generator routines that are used in the absence of further specialization code generator routines when code is generated for any modeling entity instance of the type that they define in any instance model including the instance model 20. The base code generator routine 32 for all instances of UML classes is attached to the class meta-entity 38. Similarly, the base code generator routine 34 for all UML methods is attached to the method meta-entity 40, and the base code generator routine 36 for all UML attributes is attached to the attribute meta-entity 42.

It is noted that, for illustrative purposes only, the base code generator routines 32, 34, and 36 (as well as their links to the corresponding graphical modeling entities 38, 40, and 42) are shown visually. However, the base code generator routines 32, 34, and 36 and their links (attachments) to the corresponding graphical modeling entities 38, 40, and 42 need not be visible, except when specific modeling entities are explicitly examined.

Meta model entities and instance model entities can provide code generator routines to other graphical modeling entities from the same or different modeling notations when these are queried for their code generator routines. For example, a method code generator routine 56 in the instance model 22 can override the base method code generator routine 34 in the meta model 24. This is important in order to produce processor-specific code. In FIG. 2, all of the software methods that are mapped to the meta model 24 and that are executed on processor P2 will select the cross-domain method routine 56 over the base method routine 34. Accordingly, the method code generator routine 56 is an example of cross-domain specialization.

Moreover, arbitrary user defined collections of graphical modeling entities can have specialized code generator routines that override base code generator routines. For example, the X and Y stereotype nodes 50 and 52 in the instance model 20 have attached class code generation routine 54 that overrides the base class code generation routine 32 in meta model 24. Accordingly, the class code generator routine 54 is an example of stereotype specialization.

As another example of stereotype specialization, in order to produce thread specific code using only a UML model, the concept of threads needs to be introduced within the UML model. One way of introducing the concept of threads within the graphical modeling notation is to create a stereotype named "Thread." However, thread entities should not be treated the same as other UML classes during code generation. For example, a class declaration should not be generated for a Thread class within a C++ header file. Using model-based composable code generation, stereotype specialization can be used to ensure that all Thread instances point to a specialized code generator routine that will take precedence over the base code generator routine that typical UML classes share. Hence, instances of Thread objects will be treated appropriately whenever code is generated for the UML model.

While the prior art can handle this problem by hard coding a switching operation in the code generator, hard coding of the code generator is more error prone and harder to verify and modify than is the specialized code generator routine discussed in the preceding paragraph.

Furthermore, architectural compositional constructs (e.g., archetypes) can have their own code generator routines that can override base code generator routines within their scope. For example, the archetype Z node 46 contains an internal code generator routine 48 that overrides the base method code generator routine 34 for all methods within its scope (i.e., those that are internal to the archetype). Accordingly, the archetype Z node 46 in the instance model 20 is an example of scoped specialization.

Graphical modeling entity instances can have instance-specific code generator routines attached to them that can override all other code generator routines. For example, a specialized method code generator routine 44 that is attached directly to a method (i.e., method m4( ) of class C) in the instance model 20 overrides both the base method routine 34 and the cross-domain method routine 56. Accordingly, the method code generator routine 44 is an example of instance specialization.

The use of generator specialization in model-based composable code generation provides a new kind of composability for constructing model-based code generators that can be incrementally constructed, maintained, and extended as meta models and instance models evolve. Code can be generated from these specialized code generators using base code generator routines in a manner that is functionally equivalent to the way in which code is currently generated. At the same time, instance, stereotype, scoped, and cross-domain specialization can be applied seamlessly in support of special case and cross-domain code generation.

It is noted that the selection among various routines need not be performed using a priority scheme. Other schemes are possible within the invention. Also, selection among code generator routines for a given graphical modeling entity can depend on various properties of that graphical modeling entity as well as the properties of other graphical modeling entities from diverse modeling notations. Because these properties are subject to frequent modification, code generator routine selection may need to be performed dynamically at the time of code generation.

Figure 3:
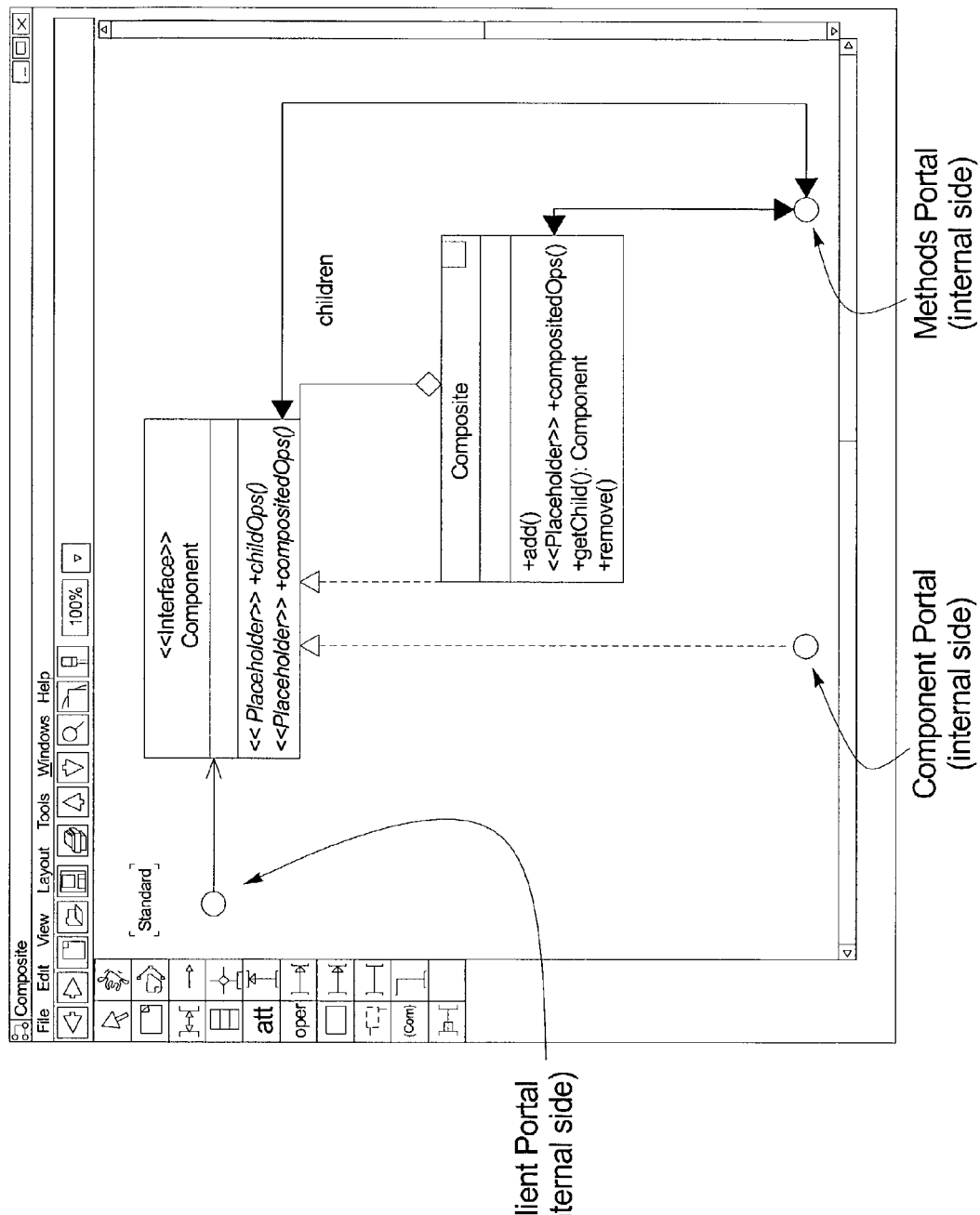
FIG. 3 illustrates an internal UML model of an archetype that corresponds to a Composite design pattern providing an example for the present invention.
Figure 4:
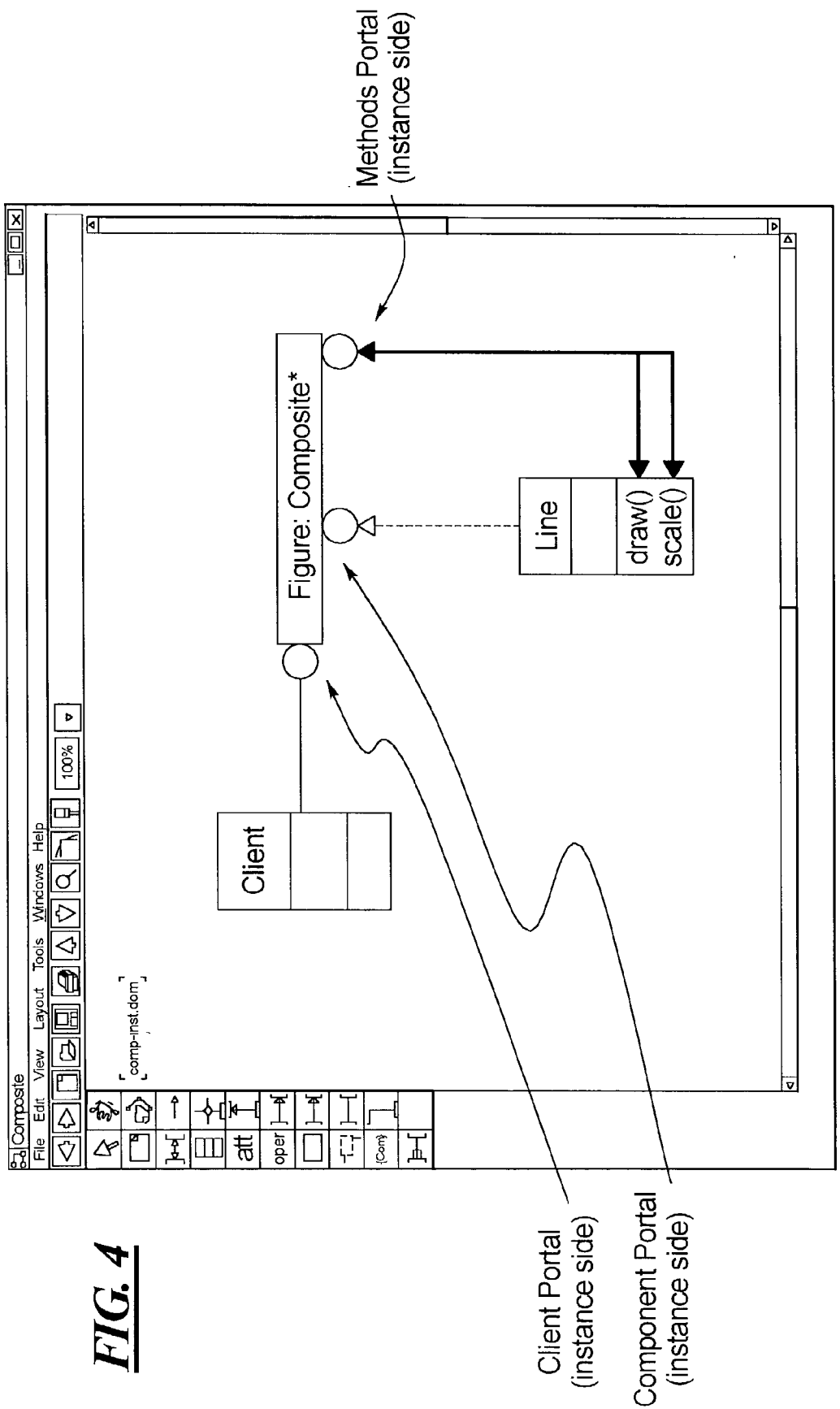
FIG. 4 illustrates an external view of an instance of the archetype of FIG. 3 having three portals, a client portal, a component portal, and a methods portal.

A specific example of the model-based composable code generation framework is now given based on the Composite design pattern from "Design Patterns: Elements of Reusable Object-Oriented Software" by E. Gamma, R. Helm, R. Johnson, and J. Vlissides, Addison-Wesley, 1995. FIG. 3 shows an internal UML model of an archetype that corresponds to this Composite design pattern. FIG. 4 shows the external (i.e., black box) view of an instance of this archetype named "Figure" that has three portals, a client portal, a component portal, and a methods portal. Associating these portals with the UML graphical modeling entities has completed the context of the archetype instance in FIG. 4.

Each portal on an archetype instance is associated with a corresponding portal in some internal model. In the case of FIGS. 3 and 4, the internal model is the UML model shown in FIG. 3. Arcs on either side of corresponding portals are logically matched. Hence, as shown in FIG. 4, the Line class logically has a realization arc to the Component class.

The thick black arcs indicate equivalence. Consequently, the draw( ) operation of the Line class in FIG. 4 is equivalent to each compositedOps( ) operation with the Placeholder stereotype. Similarly, the scale( ) operation of the Line class in FIG. 4 is also equivalent to each compositedOps( ) operation. Conceptually, this nomenclature indicates that each of the Component and Composite classes has these two operations in addition to any others.

E. Gamma, R. Helm, R. Johnson, and J. Vlissides describe the Component class as a generic class that provides a common interface for its children. Even as we can think of a single graphical figure as being made up of a number of individual lines, in this example, the archetype instance named "Figure" provides a single interface to the various Line objects that as a collection make up the logical figure. Hence, the archetype instance can be utilized as a single entity as opposed to having to perform all operations separately upon all of the Lines that make up the logical figure.

The Composite class implements the Component interface and can contain other components. For every operation in these components, the Composite class needs to contain a corresponding operation. When the operation is invoked on the Composite, it will iterate over each component and invoke its corresponding operation. In the archetype, the actual components (such as Line in FIG. 4) connect to the Component class through the Component portal. The operations that are to be iterated over (such as the draw( ) and scale( ) operations of FIG. 4) must be connected to the methods portal. The Client class in FIG. 4 has an association through the client portal to the Component Class. This association consolidates the coupling between the client and the components and composite.

In model-based composable code generation, modeling entities may have one or more code generator routines associated with them that are used to generate their portions of the code of a given type. Alternatively, entities need have no routines if they are not responsible for generating code in a given context. The graphical modeling entities shown in FIGS. 3 and 4 are no exceptions. Here, the Client, Line, Component, and Composite classes use a base code generator routine that is attached to the meta information for the corresponding UML class. This base code generator routine is shown in Appendix A and is an example of a routine that is general to all UML classes for generating Java source code in absence of any type of generator specialization.

Similarly, all of the operations that are not stereotyped as Placeholder use the base (Java) code generator routine for UML operations. This base code generator routine is shown in Appendix B. However, there is additional complexity here because, in order to specify more information than is easily accomplished under the UML graphical modeling notation, UML operations are linked to 'method' modeling entity instances that are defined outside of UML in a Method graphical modeling notation. That is, each UML operation can have a pointer to a method entity in which is modeled further information regarding that operation. The first IF statement in the second line of the base code generator routine shown in Appendix B checks to see if such a pointer is set. If so, the code generator routine requests the method entity to generate its code. Otherwise, the code generator routine of Appendix B generates what code it can based on the type of information that can be specified under the UML class diagram notation. This technique allows for richer code generation than is easily specified given the UML modeling notation.

Those operations that are stereotyped as Placeholder have specialized code generator routines associated with them that are specific to the archetype. The specialized code generator routine that is attached to the operation childOps( ) is shown in Appendix C and gathers the signatures of the operations from the Composite class. The operation is modeled as an abstract operation; therefore, the generated methods are also abstract. This abstraction allows definition of the operations for composites (add( ), remove( ), and getChild( )) in the Composite class and avoids any coupling with the Component class. This abstraction represents instance specialization.

Both compositedOps( ) operations shown in FIG. 3 use the same specialized code generator routine. This specialized code generator routine is shown in Appendix D. However, the code generated for each class will be different because the compositedOps( ) in the Component class is abstract, while the compositedOps( ) in the Composite class is not. In fact, the output code will not contain a compositedOps( ) method, but instead each compositedOps( ) operation will be replaced by all of those operations that are connected to the instance side of the Methods Portal (i.e., draw( ) and scale( )). This approach allows any number of operations (with arbitrary signatures) to be composited. Appendix D represents stereotype specialization because a user defined collection of modeling entities share a routine that overrides a base routine.

During the composable code generation process for the models shown in FIG. 3 and FIG. 4, the code generation process traverses the model from one graphical modeling entity to the next. In one embodiment, code generation starts with the Client class graphical modeling entity shown in FIG. 4. The base code generator routine for UML class instances includes a call to all of the connected association arcs to generate their code in order to build up a list of attributes for the class instance. In this case, the Client class graphical modeling entity has only a single association arc coupling the Client class graphical modeling entity to the Client Portal.

Next, the Line class graphical modeling entity generates its code. This class also uses the base UML class Java code generator from Appendix A. Because the base code generator routine for UML classes also includes a call for all of its operations to generate their portions of the code, the operations draw( ) and scale( ) are each traversed and requested to generate their portions of code. These two operations both use the base Java code generator from Appendix B for this purpose. In this embodiment, there is currently no Java routine associated with the realization arc that links the Line class to the Component Portal. Therefore, the composite archetype instance named "Figure" is traversed next. Its code generator routine simply traverses the entities in its internal model and calls each to generate its portion of code. Additionally, as noted above, an instance routine (childOps( )) and a stereotype routine (for composited Ops( )) are encapsulated in this structure.

Appendix E shows the code that is generated when the code generator routine associated with the Client graphical modeling entity is executed, Appendix F shows the code that is generated when the code generator routine associated with the Line graphical modeling entity is executed, Appendix G shows the code that is generated when the code generator routine associated with the Component graphical modeling entity is executed, and Appendix H shows the code that is generated when the code generator routine associated with the Composite graphical modeling entity is executed.

It should be noted that not only is the structure of the code generated automatically (as is typical for UML class diagrams), but also the bodies of the operations for the classes that are internal to the archetype are generated automatically as well.

Figure 5:
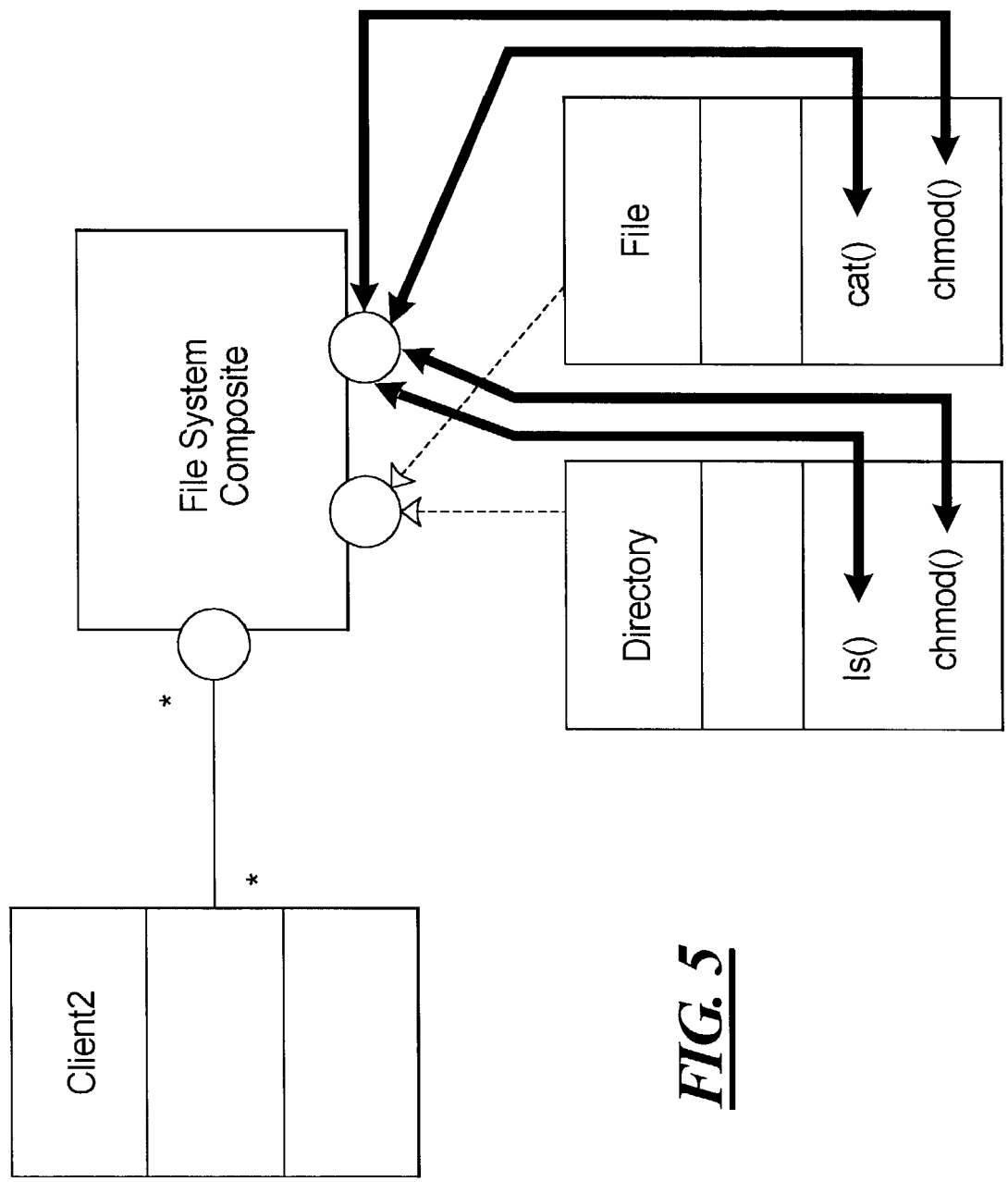
FIG. 5 provides an example of scoped specialization.

One form of code that can be generated is documentation. When generating documentation, it is useful to be able to automatically generate the name of each modeling entity. Therefore, it is natural for a documentation code generator to traverse a model, and access and execute the Name generation routine of each entity encountered (as opposed to the Java code generation routine). (The purpose of a Name generation routine is to simply generate the textual name of the associated entity.) The base Name routine for UML classes returns the current value of the name attribute of that entity. A key constraint for documentation is that no two entities have the same name. Otherwise, ambiguous documentation will result. However, when multiple archetype instances that share implementations appear together in the same model, the use of the base Name routine will result in duplicate names. FIGS. 4 and 5 give an example. FIG. 5 shows a second use of the Composite Archetype. (The purpose of this sub-model is to be able to treat a number of directories and files as a single logical file system.) If the modeling entities from FIGS. 4 and 5 are both present in a single instance model, then the two identical Composite names and two identical Component names will be generated during document generation. Alternatively, a specialized scoped Name generation routine that returns the name of the archetype instance concatenated with the name of the interior UML class can be attached to the Composite archetype definition. Hence, whenever a Name is generated for a UML class instance that is internal to the Composite archetype, the name will be unique, assuming that the name of each archetype instance is unique. This is an example of scoped specialization.

Figure 6:
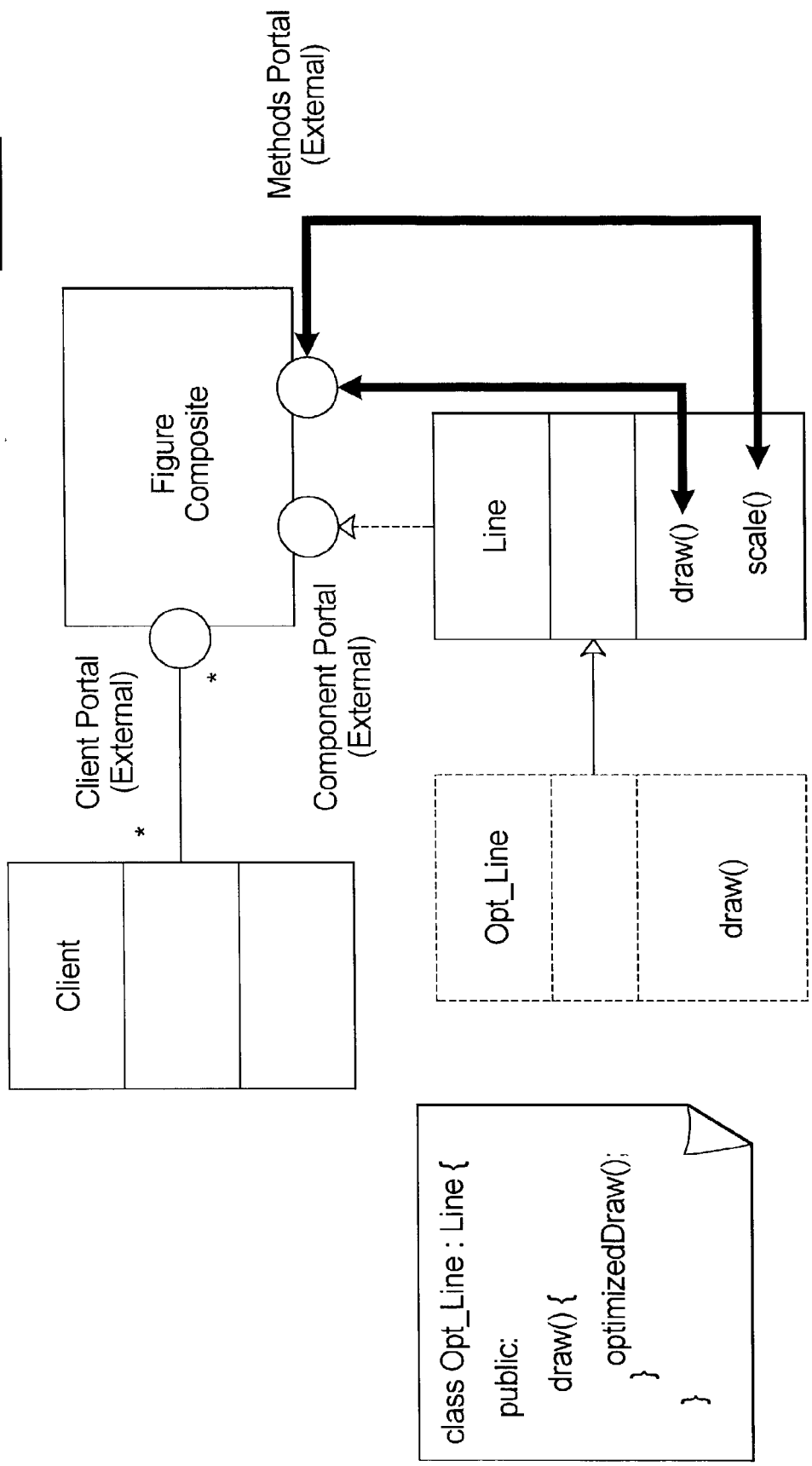
FIGS. 6 and 7 provide an example of cross-domain specialization.

An embedded system model consisting of hardware and software domain models provides another example. The hardware model contains two processors P1 and P2 on which the software is run, as illustrated in FIG. 2. The processor P2 may be assumed to contain an addition video processing chip that improves the speed at which graphics are drawn, but only if a vendor-supplied optimizedDraw( ) routine is called in place of the normal draw( ) routine. Here, it would be beneficial for the code generator to be able to automatically detect if the software modeling entity for which code is being generated at any given time is to be executed on P2. If so, the specialized optimizedDraw( ) routine will be called. This detection is possible by means of cross-domain specialization. Here, as the methods are traversed to access their code generation routines, the cross-domain specialization Method routine 56 instead of the base Method routine 34 of FIG. 2 will be returned and executed. The resulting code will consist of an additional class Opt_Line that is generated. This class inherits from the Line class as illustrated in FIG. 6. Objects of type Opt_Line will behave exactly as those of type Line (due to inheritance semantics) except that, when these objects are given the draw( ) message, they will execute the code as shown in FIG. 6 (i.e., they will call the vendor-supplied optimized-Draw( )). This is an example of cross-domain specialization.

Figure 7:
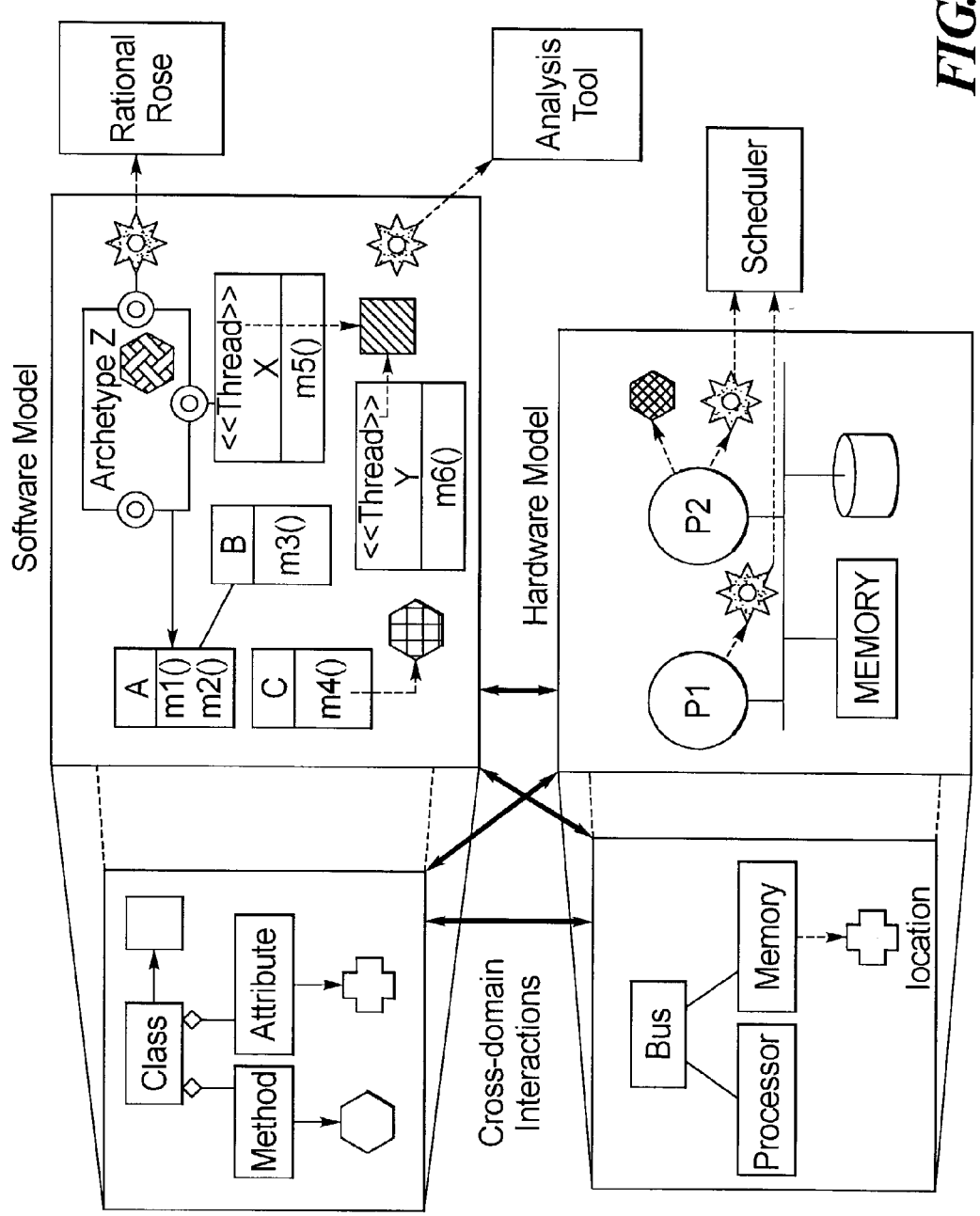

A new framework for the composition of cross-domain code generators that is flexible and customizable has been described. The use of generator specialization is especially interesting within this framework as it has the potential to result in cross-tool cooperation for code generation. FIG. 7 provides an example. Here, graphical modeling entities (reference the stars in the figures) are instantiated in graphical models (reference) that represent pointers to external data stores as well as models defined in different modeling tool suites. Normally, such data is useless within a graphical modeling notation, because such data cannot be interpreted. However, with the model-based composable code generation described herein, when code is being generated and an entity is asked to provide its code generator, the entity code generation routine can (instead of generating code directly) automatically call an outside tool on a specific data file and return the results. The composable code generation framework supports this easy mechanism for seamless cooperative code generation. This arrangement represents a transparent tool cooperation capability.

Certain modifications of the present invention have been described above. Other modifications will occur to those practicing in the art of the present invention. For example, as should be clear from the above description, the code generator routines attached directly to graphical modeling entities need not generate programming code when they are executed. Instead, these code generator routines can instead generate formatted inputs for diverse tools or other types of models. Thus, execution of code generator routines can generate scheduling and analysis tool inputs, configuration files, documentation, etc.

Code generation merely changes the form of the information that is specified in one or more models from one form (e.g., graphical) to another (e.g., textual). As such, the code generated during the execution of code generator routines need not be textual such as source code and the other textual code described above. Instead, the execution of composable code generation routines may result in new non-textual artifacts such as new instance models. For example, the execution of composable code generation routines on an embedded system model depicting the hardware and software that are required to provide the memory, processing, and communication resources may result in the instantiation of a new resource model conforming to a different modeling notation. This model could depict the same information that was specified in the hardware and software models, but in a new resource-centric way. That is, a new view of the same information specified in the existing models could automatically be created.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

APPENDIX A

```
Set interfaceOrClass to (get-property 'stereotype ms-subject)
Set interfaceOrClass to (if (string=? interfaceOrClass "Interface") "interface" "class")
Set inheritList to (mobies-alter-user::chaining-immediate-parent-list ms-subject uml::umlinheritsfrom)
Set delegateList to ( )
Set extendString to " "
If (not (null? inheritList)) Then
   Set extendString to (append " extends " (name (car inheritList)))
   Set delegateList to (cdr inheritList)
End If
Set realizationList to (map name (mobies-alter-user::chaining-immediate-parent-list ms-subject uml::umlrealization))
Set implementString to (if (not (null? realizationList)) (append " implements " (mobies-alter-user::stringlist->string realizationList ", ")) " ")
public interfaceOrClass (name ms-model)
extendString
implementString
{
Set atLeastOneAttribute to #f
For aDelegate in delegateList Loop
      (name aDelegate) my(name aDelegate) = new (name aDelegate);
   Set atLeastOneAttribute to #t
End Loop over delegates
For outgoingAssociation in (select (outgoing-arcs ms-subject) (lambda (oa) (is-a? oa uml::umlassociation))) Loop
   If (alter-user::generate-this-code outgoingAssociation (get-property "port" ms-settings) "Java" (build-param-dictionary ms-parameters '(('direction
   . 'out)))) Then
      End
   Set atLeastOneAttribute to #t
End Loop over outgoing associations
For incomingAssociation in (select (incoming-arcs ms-subject) (lambda (ia) (is-a? ia uml::umlassociation))) Loop
   If (alter-user::generate-this-code incomingAssociation (get-property "port" ms-settings) "Java" (build-param-dictionary ms-parameters '(('direction
   . 'in)))) Then
      End empty if
   Set atLeastOneAttribute to #t
End Loop over incoming associations
For anAssociation in (uml::equiv-get-associations ms-subject) Loop
   Set myDirection to (if (eq? ms-subject (origin anAssociation)) 'out 'in)
   If (alter-user::generate-this-code anAssociation (get-property "port" ms-settings) "Java" (build-param-dictionary ms-parameters '(('direction .
   myDirection)))) Then
      End
   Set atLeastOneAttribute to #t
End Loop over outgoing associations
```

APPENDIX A-continued

For anAttribute in (select (components ms-subject) (lambda (c) (is-a? c uml::umlattribute))) Loop
  Set atLeastOneAttribute to #t
  If (alter-user::generate-this-code anAttribute (get-property "port" ms-settings) "Java" (build-param-dictionary ms-parameters)) Then
  End If
End For
For anAttribute in (uml::equiv-get-attributes ms-subject) Loop
  Set atLeastOneAttribute to #t
  If (alter-user::generate-this-code anAttribute (get-property "port" ms-settings) "Java" (build-param-diccionary ms-parameters)) Then
  End If
End For
Set operationList to (select (components ms-subject) (lambda (c) (is-a? c uml::umloperation)))
Insert a blank line between attributes and methods
If (and atLeastOneAttribute (not (and (null? operationList) (or (null? delegateList) (nil? (detect (flatten (map elements delegateList)) (lambda (anElem) (is-a? anElem uml::umloperation))))))) Then
End If
Loop over delegates and generate methods for every public operation that this class doesnt override
For aDelegate in delegateList Loop
  For anOperation in (select (elements aDelegate) (lambda (elem) (and (is-a? elem uml::umloperation) (nil? (detect operationList (lambda (op) (mobies-alter-user::operations-equal? elem op))))))) Loop
    Set vis to (mobies-alter-user::chaining-get-property anOperation 'visibility)
    If (or (eq? vis 'public) (eq? vis 'protected)) Then
      Set paramString to " "
      Set delimiter to " "
      For aParameter in (mobies-alter-user::chaining-get-parameters anOperation) Loop
        Set paramString to (append paramStrimg delimiter (mobies-alter-user::translate-type (car aParameter) "java") " " (cdr aParameter))
        Set delimiter to ", "
      End Loop over paramters
      (symbol->string vis) (let ((retTypes (mobies-alter-user:chaining-get-return-types anOperation))) (if(null? retTypes)
      "void" (mobies-alter-user:translate-type (car retTypes) "java"))) (mobies-alter-user.:chaining-get-property anOperation 'name)(paramString)
      {
        my(mobies-alter-user:chaining-get-property aDelegate 'name).(mobies-alter-user::chaining-get-property anOperation 'name)
        ((mobies-alter-user::stringlist->string (map cdr (mobies-alter-user chaining-get-parameters anOperation)) ","));
      }
    End If the operation is public or protected
  End Loop over operations
End Loop over delegates
For anOperation in operationList Loop
  If (alter-user::generate-this-code anOperation (get-property "port" ms-settings) "Java" (build-param-dictionary ms-parameters)) Then
  End If
End Loop over operations
For anOperation in (uml::equiv-get-operations ms-subject) Loop
  If (alter-user::generate-this-code anOperation (get-property "port" ms-settings) "Java" (build-param-dictionary ms-parameters)) Then
  End If
End For
}

APPENDIX B

Set methPtr to (get-property "methodPtr" ms-subject)
If (not (or (nil? methPtr) (eg? methPtr 'tbd))) Then
    If (generate-this-code methPtr (get-property "port" ms-settings)
    "Java" (build-param-dictionary ms-parameters)) Then End empty If
End If corresponding method
If (or (nil? methPtr) (eq? methPtr 'tbd)) Then
    Set visibility to (get-property 'visibility ms-subject)
    Set abstract to (get-property 'is-abstract ms-subject)
    Set retTypeList to (get-property 'return ms-subject)
    Set retType to (if (null? retTypeList) nil (car retTypeList))
    Set retTypeString to (let ((typeString (mobies-alter-user::translate-type retType "Java"))) (if (string=? typeString "nil") "void" typeString))
    Set argsList to (get-property 'parameters ms-subject)
    Set argsString to (mobies-alter-user::stringlist->string argsList ",")
        (if (or (nil? visibility) (eq? visibility 'tbd)) "private" visibility)
        retTypeString (name ms-subject)(argsString)(if abstract
        ",(append (string #\newline) " { }"))
End If no corresponding method

APPENDIX C

Set ms-subject to (car (subdiagrams (detect (uml::classes (graph ms-subject)) (lambda (c) (string=? (name c) "Composite")))))
For anOperation in (select (nodes ms-subject) (lambda (n) (is-a? n mobies-method::mobmethodmethod))) Loop
    Set opVisibility to (get-property 'visibility anOperation)
    Set returnObject to (if (not (null? (get-property "return" anOperation)))
            (car (get-property "return" anOperation))
            nil)
    Set parameterList to (get-property 'parameters anOperation)
    Set parameterString to ""
    Set delimiter to ""
    For aParameter in parameterList Loop
        Set parameterString to (append parameterString delimiter (generate-to-string aParameter "Java" (build-param-dictionary ms-parameters)))
        Set delimiter to ","
    End Loop
    If (not (or (nil? returnObject) (eq? returnObject 'tbd))) Then
        Set returnString to (generate-to-string returnObject "Java" (build-param-dictionary ms-parameters))
    End If
    If (or (nil? returnObject) (eq? returnObject 'tbd)) Then
        Set returnString to "void"

APPENDIX C-continued

```
End If
    (if (or (nil? opVisibility) (eq? opVisibility 'tbd)) "private"
    op Visibility) returnString (name anOperation)
    (parameterString),
End Loop
```

APPENDIX D

```
Set portalList to (append (map origin (incoming-arcs ms-subject)) (map
destination (outgoing-arcs ms-subject)))
For aPortal in portalList Loop
    Set patternInstance to (dictionary-ref ms-parameters 'instance)
    Set methodNameList to (mobies-alter-user::chaining-get-property
    aPortal 'name patternInstance)
    Set visList to (mobies-alter-user::chaining-get-property aPortal '
    visibility patternInstance)
    Set paramList to (mobies-alter-user::chaining-get-parameters
    aPortal patternInstance)
    Set retTypeList to (mobies-alter-user::chaining-get-return-types
    aPortal patternInstance)
    Sanity checks
    If (= (length methodNameList) (length visList) (length paramList)
    (length retTypeList)) Then
        Set index to 0
        For aMethodName in methodNameList Loop
            Set paramString to ""
            Set delimiter to ""
            For aParameter in (list-ref paramList index) Loop
                Set paramString to (append paramString delimiter
    (mobies-alter-user::translate-type (car aParameter) "java") ""
    (cdr aParameter))
                Set delimiter to ","
            End Loop over parameters
            If (get-property 'is-abstract ms-subject) Then
                (if (or (nil? (list-ref visList index)) (eq? (list-ref visList
index) 'tbd)) "private" (symbol->string (list-ref visList index))) (if (null?
(list-ref retTypeList index)) "void" (mobies-alter-user translate-type (car
(list-ref retTypeList index)) "Java")) aMethodName(paramString),
            End If
            If (not (get-property 'is-abstract ms-subject)) Then
                (if (or (nil? (list-ref visList index)) (eq? (list-ref visList index)
'tbd)) "private" (symbol->string (list-ref visList index))) (if (null? (list-
ref retTypeList index)) "void" (mobies-alter-user translate-type (car (list-
ref retTypeList index)) "Java")) aMethodName(paramString)
                {
                    Enumeration kids = children elements( ),
                    while kids.hasMoreElements( )
                    {
                        (Component) (kids.nextElement( )).aMethodName
                        ((mobies-alter-user::stringlist->string (map cdr (list-
                        ref paramList index)) ",")),
                    }
                }
            Set index to (+ 1 index)
            End If concrete method
        End Loop over methods
    End If lists don't match up
End Loop
```

APPENDIX E

```
public class Client
{
    private Vector component = new Vector( ),
}
```

APPENDIX F

```
public class Line implements Component
{
    private void draw( )
    { }
```

APPENDIX F-continued

```
    private void scale( )
    { }
}
```

APPENDIX G

```
public interface Component
{
    private Vector composite = new Vector( ),
    public void add(Component child),
    public Component getChild(int index),
    public void remove(Component child),
    private void draw( ),
    private void scale( );
}
```

APPENDIX H

```
public class Composite implements Component
{
    private Vector children = new Vector( ),
    public void add(Component child)
    {
        children add(child),
    }
    private void draw( )
    {
        Enumeration kids = children elements( ),
        while kids hasMoreElements( )
        {
            (Component)(kids nextElement( )) draw( ),
        }
    }
    private void scale( )
    {
        Enumeration kids = children elements( ),
        while kids hasMoreElements( )
        {
            (Component) (kids nextElement( )) scale( ),
        }
    }
    public Component getChild(int index)
    {
        children get(index),
    }
    public void remove(Component child)
    {
        children remove(child),
    }
}
```

We claim:

1. A method of generating code in a model-based development environment comprising:
    modeling a system using graphical modeling entities;
    attaching modular code generator routines directly to the graphical modeling entities such that each of at least some of the graphical modeling entities has more than one code generator routine attached thereto;
    accessing the code generator routines such that, for each of the graphical modeling entities having more than one code generator routine attached thereto, only one of the code generator routines is selected based upon criteria; and,
    executing each of the selected code generator routines so as to generate the code.

2. The method of claim 1 wherein the selection criteria is comprised of a priority scheme.

3. The method of claim 1 wherein the selection criteria is comprised of a keyword-based index.

4. The method of claim 1 wherein the attaching of modular code generator routines directly to the graphical modeling entities comprises attaching one of the modular code generators to a meta-entity.

5. The method of claim 4 wherein the accessing of the code generator routines comprises accessing the code generator routines of the modeling entity; and accessing the code generator routines of the corresponding meta-entity.

6. The method of claim 1 wherein the attaching of modular code generator routines directly to the graphical modeling entities comprises attaching one of the modular code generators to a collection of entities.

7. The method of claim 6 wherein the accessing of the code generator routines comprises accessing the code generator routines of the modeling entity; and accessing the code generator routines of all of the collections of entities to which the modeling entity belongs.

8. The method of claim 1 wherein the attaching of modular code generator routines directly to the graphical modeling entities comprises attaching a base code generator routine and a specialized code generator routine to at least one of the graphical modeling entities, and wherein the accessing of the code generator routines comprises accessing the specialized code generator routine but not the base code generator routine.

9. The method of claim 8 wherein the specialized code generator routine comprises a specialized instance code generator routine.

10. The method of claim 8 wherein the specialized code generator routine comprises a specialized structural code generator routine.

11. The method of claim 8 wherein the specialized code generator routine comprises a specialized stereotype code generator routine.

12. The method of claim 8 wherein the specialized code generator routine comprises a specialized cross-domain code generator routine.

13. The method of claim 1 wherein the attaching of modular code generator routines directly to the graphical modeling entities comprises attaching first and second specialized code generator routines to at least one of the graphical modeling entities, and wherein the executing of the code generator routines comprises executing the first specialized code generator routine but not the second specialized code generator routine according to the selection criteria.

14. The method of claim 13 wherein the first specialized code generator routine comprises a specialized instance code generator routine, and wherein the second specialized code generator routine comprises a specialized scoped code generator routine.

15. The method of claim 13 wherein the first specialized code generator routine comprises a specialized instance code generator routine, and wherein the second specialized code generator routine comprises a specialized stereotype code generator routine.

16. The method of claim 13 wherein the first specialized code generator routine comprises a specialized instance code generator routine, and wherein the second specialized code generator routine comprises a specialized cross-domain code generator routine.

17. The method of claim 13 wherein the first specialized code generator routine comprises a specialized stereotype code generator routine, and wherein the second specialized code generator routine comprises a specialized scoped code generator routine.

18. The method of claim 13 wherein the first specialized code generator routine comprises a specialized stereotype code generator routine, and wherein the second specialized code generator routine comprises a specialized cross-domain code generator routine.

19. The method of claim 13 wherein the first specialized code generator routine comprises a specialized scoped code generator routine, and wherein the second specialized code generator routine comprises a specialized cross-domain code generator routine.

20. The method of claim 1 wherein the executing of each of the accessed code generator routines comprises executing at least one of the accessed code generator routines so as to generate textual code.

21. The method of claim 20 wherein the textual code comprises programming code.

22. The method of claim 20 wherein the textual code comprises configuration file code.

23. The method of claim 20 wherein the textual code comprises documentation code.

24. The method of claim 20 wherein the textual code comprises tool input code.

25. The method of claim 1 wherein the executing of each of the accessed code generator routines comprises executing at least one of the accessed code generator routines so as to generate non-textual code.

26. The method of claim 1 wherein the selected code generator routine executes at least one operation on an outside tool.

27. The method of claim 1 wherein the selection of the code generator routine is performed dynamically at code generation time.

* * * * *